United States Patent
Minz et al.

(10) Patent No.: US 8,112,466 B2
(45) Date of Patent: Feb. 7, 2012

(54) FIELD PROGRAMMABLE GATE ARRAY

(75) Inventors: Deboleena Minz, New Delhi (IN);
Kailash Digari, Uttar Pradesh (IN)

(73) Assignee: Sicronic Remote KG, LLC, Wilmington, DE (US)

( * ) Notice: Subject to any disclaimer, the term of this patent is extended or adjusted under 35 U.S.C. 154(b) by 1359 days.

(21) Appl. No.: 11/238,123

(22) Filed: Sep. 28, 2005

(65) Prior Publication Data

US 2006/0075012 A1    Apr. 6, 2006

(30) Foreign Application Priority Data

Sep. 28, 2004   (IN) .............. 1862/DEL/2004

(51) Int. Cl.
*G06F 7/38* (2006.01)

(52) U.S. Cl. .......... 708/230; 708/523; 708/603

(58) Field of Classification Search ............ 708/232, 708/523, 603, 230
See application file for complete search history.

(56) References Cited

U.S. PATENT DOCUMENTS

| | | | |
|---|---|---|---|
| 6,483,343 B1 * | 11/2002 | Faith et al. ................ | 326/40 |
| 6,538,470 B1 * | 3/2003 | Langhammer et al. ........ | 326/41 |
| 6,573,749 B2 | 6/2003 | New et al. | |
| 2003/0141898 A1 | 7/2003 | Langhammer et al. | |
| 2006/0288070 A1 * | 12/2006 | Vadi et al. ................... | 708/524 |

* cited by examiner

*Primary Examiner* — Chuong D Ngo

(57) ABSTRACT

An efficient implementation of DSP functions in a field programmable gate array (FPGA) using one or more computational blocks, each block having of a multiplier, an accumulator, and multiplexers. The structure implements most common DSP equations in a fast and a highly compact manner. A novel method for cascading these blocks with the help of dedicated DSP lines is provided, which leads to a very simple and proficient implementation of n-stage MAC operations.

12 Claims, 10 Drawing Sheets

FIELD PROGRAMMABLE GATE ARRAY

BACKGROUND OF THE INVENTION

1. Field of the Invention

The present invention relates to an efficient implementation of DSP functions in a field programmable gate array (FPGA).

2. Description of the Related Art

Digital signal processing (DSP) has traditionally been done using enhanced microprocessors. Although DSP processors are programmable through software, yet the DSP processor hardware architecture used is not flexible. Therefore, the performance of the DSP processors is limited by fixed hardware architecture such as bus performance bottlenecks, a fixed number of multiply accumulate (MAC) blocks, fixed memory, fixed hardware accelerator blocks, and fixed data widths. Further the DSP processor's fixed hardware architecture is not suitable for certain applications that might require customized DSP function implementations.

FPGAs, on the other hand, can provide a fast, cost effective solution to many of today's complex demands for implementing DSP functionality, as FPGA is a general-purpose device that can be programmed by an end user to perform one or more selected functions. An FPGA typically includes an array of individually Configurable Logic Blocks (CLBs), each of which is programmably interconnected to the other CLB and to the input/output (I/O) pins via a programmable routing structure to provide the selected function.

Since the hardware of the FPGAs can be reconfigured, they offer complete hardware customization while implementing various DSP applications. Therefore, DSP systems implemented in FPGAs can have customized architecture, customized bus structure, customized memory, customized hardware accelerator blocks, and a variable number of MAC blocks.

The fundamental difference between a DSP processor and a generic processor lies in the DSP processor's hardware multiply-accumulate (MAC) block and specialized memory and bus structures to facilitate frequent data access commonly found in DSP applications. The MAC operation is usually the performance bottleneck in most DSP applications.

Until recently, FPGAs did not have hard IPs like memories or multipliers embedded in them. In the past few years, however, we have seen FPGAs with embedded silicon features that are ideal for DSP applications such as embedded memory, DSP blocks, and embedded processors that are well-suited for implementing DSP functions such as FIR filters, FFTs, correlators, equalizers, encoders, decoders, and arithmetic functions. Among these FPGA vendors are Xilinx, who provide embedded memories and multipliers, and Altera, who provide a complete DSP block and embedded memories for DSP applications.

FIG. 1 shows the architecture of the DSP block designed by Altera. Said DSP block has been described in detail in U.S. patent application No. 20030141898 entitled "Programmable logic devices with function-specific blocks". This DSP block incorporates not only embedded multipliers but also accumulators to perform MAC operations. The operations that are possible with this architecture are:

1. MAC=MAC+INPUT
2. MAC=MAC−INPUT

Another U.S. Pat. No. 6,573,749 filed by Xilinx incorporates embedded multipliers in its FPGAs for DSP applications. An embedded multiplier in Virtex II allows the multiplication of two 18-bit numbers. The 36-bit output is then fed via local routing resources to the CLBs for further processing. FIG. 2 shows the architecture of the Virtex II multiplier block.

Most of the DSP designs handle expressions of the form:

$$y(n)=c1.y(n-1)+c2.y(n-2)+c3.y(n-3)+\ldots \quad (1)$$

$$y(n)=a+x(n).c1 \quad (2)$$

The DSP block by Altera can implement a MAC operation, which is equation 1, in one DSP Block. However, the second equation (2) can only be implemented as $y(n)=1.a+x(n).c1$. In other words two multiplication operations would be required for its implementation. Further it allows the implementation of only a 4-tap FIR filter (18-bit precision) in each of its multifunction tiles (DSP Blocks). Since these multifunction tiles are not cascadable, any filter with more than 4 taps uses general-purpose routing resources and other general-purpose tiles for its complete implementation. And, as mentioned above, this architecture requires two clock cycles to add an extra coefficient.

Xilinx, on the other hand, provides a multiplier that can only implement the multiplication operation in the multiplier block while accumulation is carried out in the CLBs.

BRIEF SUMMARY OF THE INVENTION

The present invention aims at providing a versatile DSP block architecture, which will cater to a large section of DSP applications. In particular, not only does the present invention allow an extra coefficient to be added without consuming an extra clock cycle, but it also allows for two or more DSP blocks to be efficiently cascaded. This cascading proves highly beneficial for designs having chains of MACs for e.g., a n-tap filter (where n is only limited by the number of DSP blocks in one column of the chip) can be completely implemented in the DSP blocks using the cascade feature. An added feature is the presence of a dynamic SMUX signal, which allows the user to start a new accumulation cycle without resetting the accumulator and thereby wasting a clock cycle.

To overcome the aforesaid drawbacks, the present invention provides a versatile embedded core for implementation of DSP applications in FPGA in an area-efficient manner. It also provides efficient implementations of designs having series of MACs, for e.g., an n-tap filter where n depends upon the number of DSP blocks used in one column of the chip. The architecture disclosed herein enables efficient implementation of the DSP equation by facilitating addition of an extra coefficient without consuming an extra clock cycle, and enables cascading of the DSP blocks.

To achieve the aforementioned advantages, the present invention provides an efficient implementation of DSP functions in a FPGA using one or more computational blocks, each block including:

a multiplier receiving two data inputs;

a first multiplexer receiving a third data input at its first input port having a dynamic select line;

an accumulator having a first input port coupled to the output of the multiplier and a second input port coupled to the output of the first multiplexer; and, a register receiving its input from the accumulator and providing the final output and a feedback to the second input of the first multiplexer.

In accordance with another embodiment of the present invention, a second multiplexer is connected between the output of the accumulator and the input of the register having a first input port coupled to the output of the multiplier and a second input port coupled to the output of the accumulator. Ideally, a third multiplexer is connected at the output of the register having a first input port coupled to the output of the multiplier and second input port coupled to the output of the register. A fourth multiplexer is provided having a first input coupled to the output of the multiplier, and a second input coupled to the third data input is added to said first input port of the accumulator.

Ideally, the multiplier includes of two or more small sized multipliers.

In accordance with a further aspect of the present invention, the computational blocks are cascaded together with the output of second multiplexer of one computational block being connected to the first input of first multiplexer of the subsequent computational block.

The said computational blocks are cascaded together with the output of one computational block being connected to the first input of first multiplexer of the subsequent computational block to implement n-stage MAC operations.

An efficient implementation of DSP functions in a FPGA using one or more computational blocks is also provided, each block including:

a multiplier receiving two data inputs;

a first multiplexer having its first input coupled to the output of the multiplier and second input coupled to the third data input having a dynamic select line;

an accumulator having a first input port coupled to the output of the first multiplexer; and, a register receiving its input from the accumulator and providing the final output and a feedback to the second input of the accumulator.

In accordance with another aspect of the present invention, a circuit is provided that includes a multiplier having first and second inputs and an output, an accumulator having a first input configured to receive the output of the multiplier and further having an output, a first multiplexer having a first input to receive the output of the multiplier and a second input configured to receive the output of a register interposed between the accumulator and the first multiplexer at a second input, and a second multiplexer configured to receive a third input and to receive the output of the register and controlled by a control signal, the second multiplexer having an output coupled to a second input of the accumulator, the output of the first multiplexer constituting the output of the circuit.

In accordance with another aspect of the foregoing embodiment, a third register is provided having a first input coupled to the output of the multiplier, a second input coupled to the output of the accumulator, and an output coupled to an input of the register.

BRIEF DESCRIPTION OF THE SEVERAL VIEWS OF THE DRAWINGS

The invention will now be described with reference to the accompanying drawings

DETAILED DESCRIPTION OF THE INVENTION

Embodiments of the present invention are described below with an 18×18 multiplier, a 2:1 multiplexer, and accumulators as an example to aid better understanding. The invention is however not restricted by the sizes shown in any of the figures and any person skilled in the art can very well extend the invention to different sizes or proportions.

Figure 1:
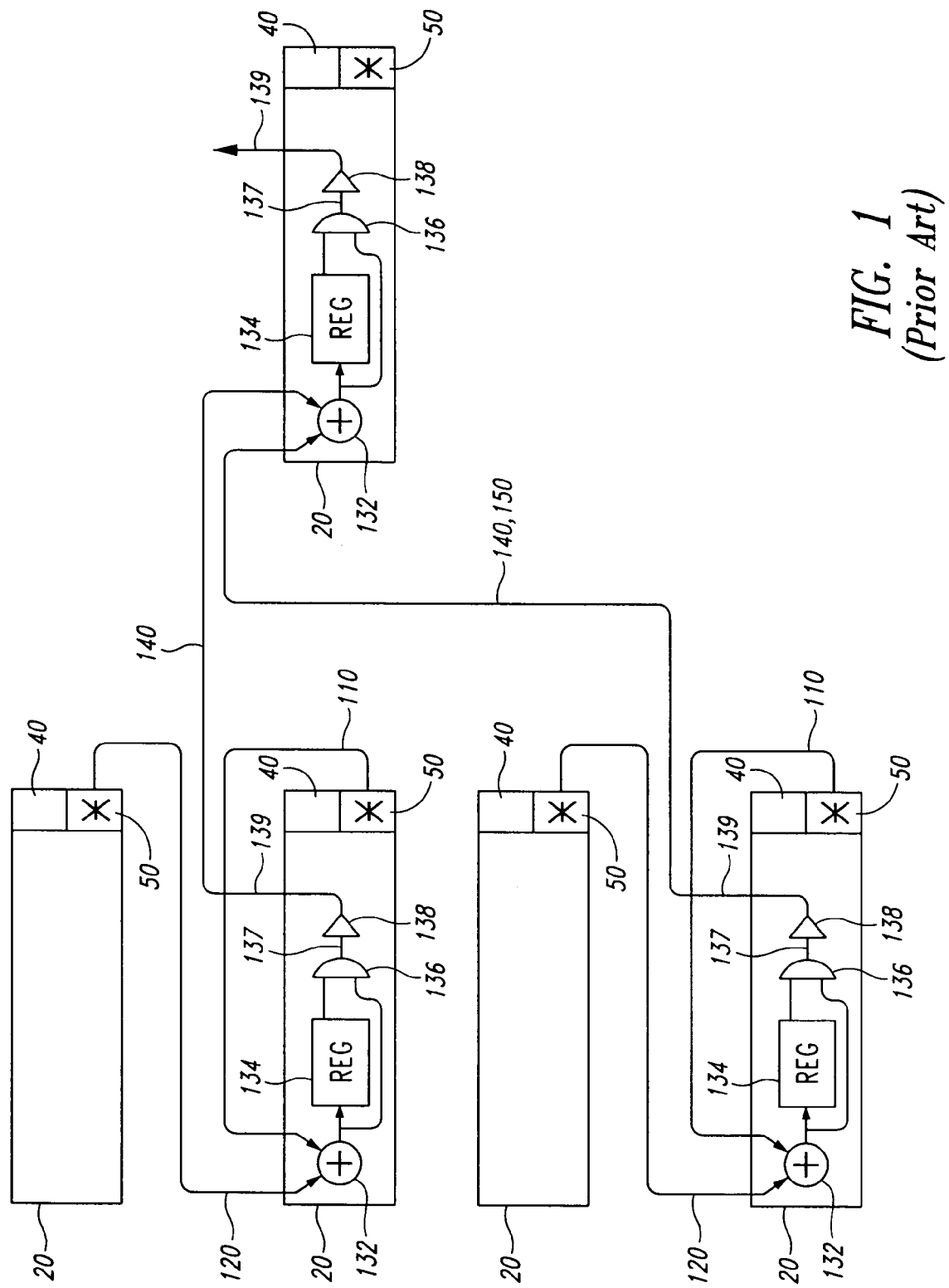
FIG. 1 shows the architecture of the DSP block designed by Altera.
Figure 2:
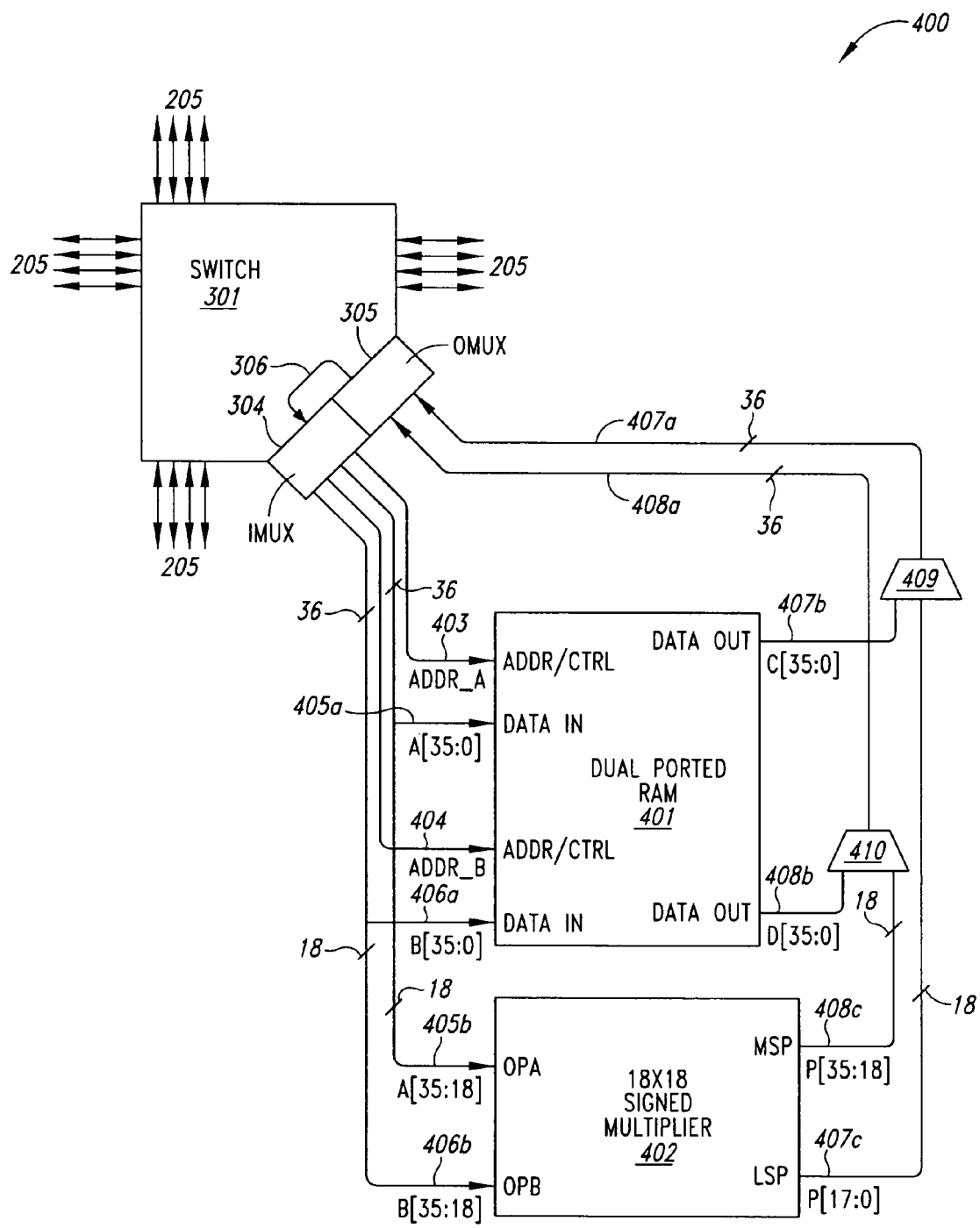
FIG. 2 shows the architecture of the Virtex II multiplier block.
Figure 3:
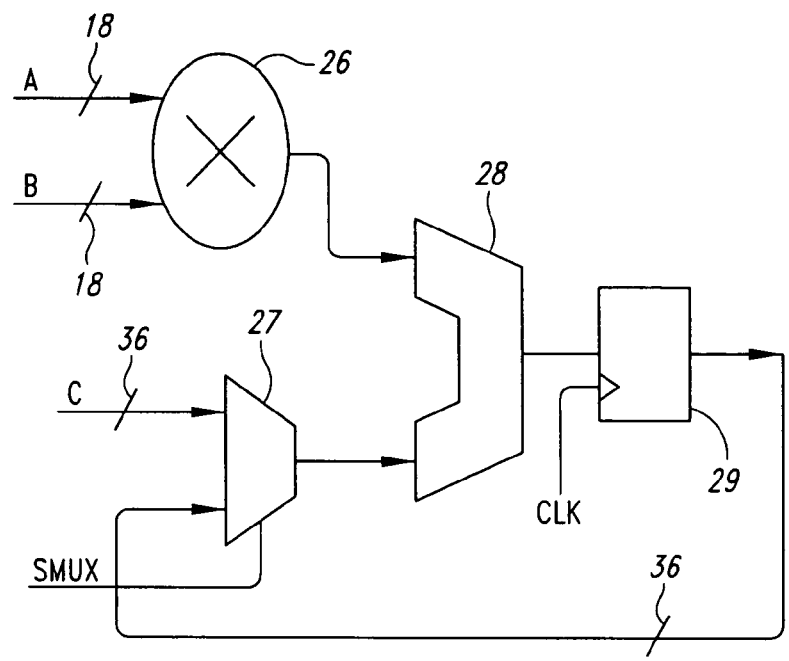
FIG. 3 shows the architecture of the DSP block in accordance with the instant invention.

FIG. 3 discloses the proposed architecture of the DSP block containing an 18×18 multiplier (26) followed by an accumulator (28) with the second input of the accumulator (28) either being a feedback or another dynamic input obtained from a multiplexer (27). The register (29) receives its inputs from the accumulator (32) and provides a feedback to the multiplexer (27) as well as provides the final input.

Figure 4:
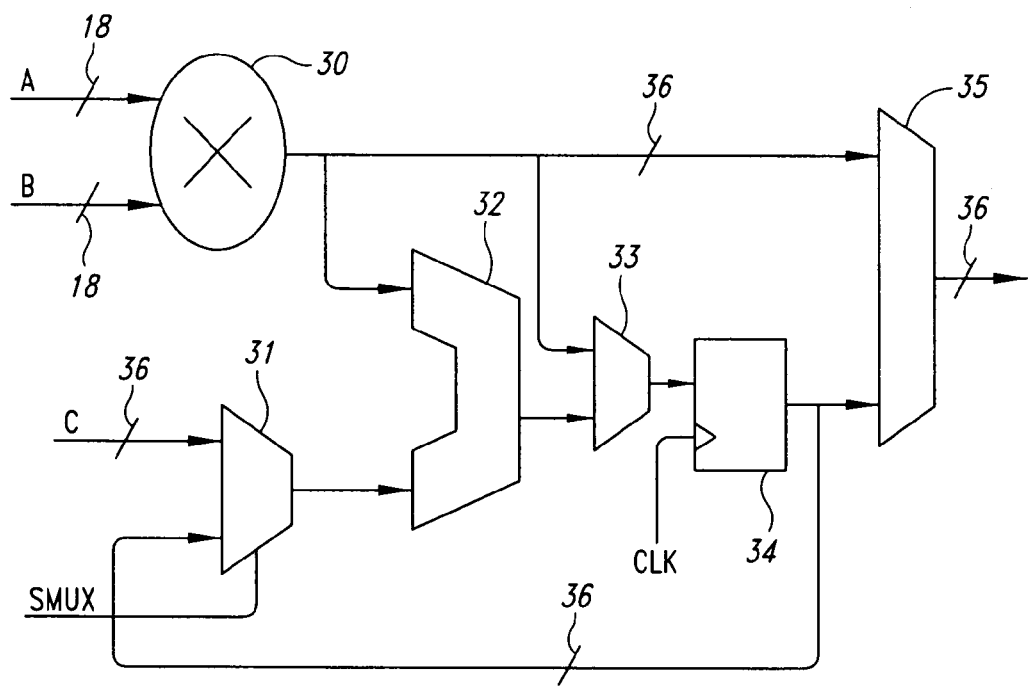
FIG. 4 shows an embodiment of the DSP block in accordance with the instant invention.

FIG. 4 discloses an embodiment of the proposed architecture of the DSP block containing an 18×18 multiplier (30) followed by an accumulator (32) with the second input of the accumulator (32) either being a feedback or another dynamic input obtained from the multiplexer (31). The multiplexer (33) receives its inputs from the accumulator (32) and the multiplier (30), while its output is registered using the register (34). The output of the register (34) is connected to the input of a multiplexer (35) while the other input of the multiplexer (35) is connected to the output of the multiplier (30).

The multiplexer (31) at one of the inputs of the accumulator (32) has a dynamic select signal SMUX. The following modes can be efficiently implemented with this architecture:

1. Mode 1: 18×18 multiplier (30) output unregistered with the accumulator (32) bypassed.
2. Mode 2: 18×18 multiplier (30) output registered with the accumulator (32) bypassed.
3. Mode 3: 18×18 multiplier (30) followed by the accumulator (32) (accumulator used with feedback).
4. Mode 4: 18×18 multiplier (30) followed by the accumulator (32) with data input C or the accumulator (32) controlled by a dynamic signal.
5. Mode 5: Accumulator (32) with an initial value.

The 18×18 multiplier (30) multiplies two 18 bit data buses A & B and gives a 36 bit output which is fed to the 36-bit accumulator (32). The other input of the 36-bit accumulator (32) is either a 36-bit data input C for implementing the equation 2 to enable accumulation of a variable and the product or a feedback input to implement equation 1 for accumulation of the product terms. The dynamic select signal SMUX is used to select the desired input of the accumulator (32).

The above-mentioned modes are described in detail along with their highlighted data paths in the latter part of the specification.

Figure 5:
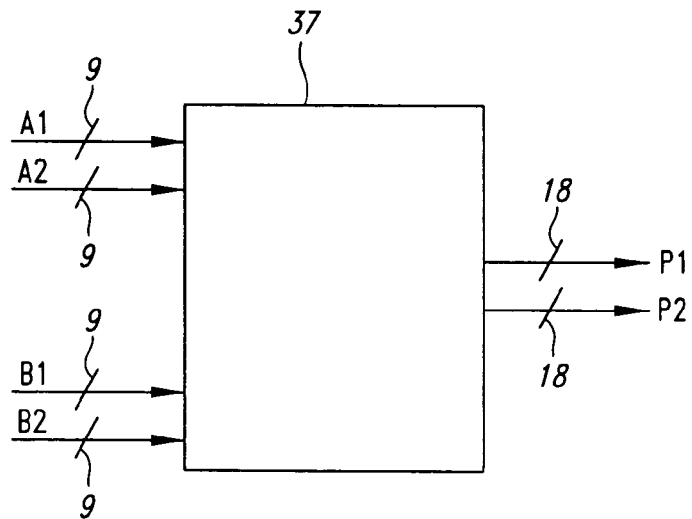
FIG. 5 shows two 9×9 multipliers with their data inputs and outputs.

In an embodiment of the present invention as shown in FIG. 5, the 18×18 multiplier of the DSP block can be broken down into two 9×9 multipliers (37). Both the multipliers (37) are logically equivalent. The data inputs and the data outputs are also broken down.

Figure 6:
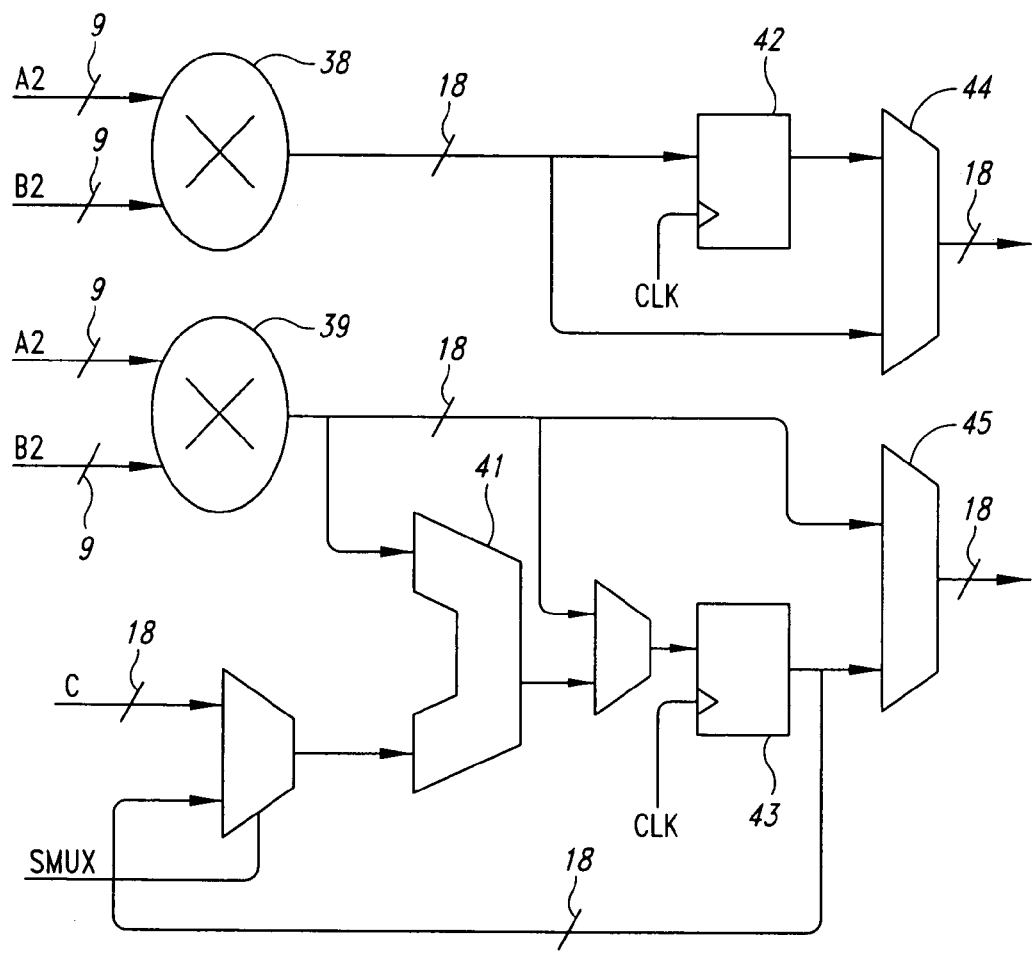
FIG. 6 shows the architecture of the DSP block with two 9×9 multipliers in accordance with the instant invention.

FIG. 6 shows the DSP block data flow using the 9×9 multipliers (38 & 39). The following modes of operation are available to the user:

1. Two 9×9 multipliers with registered outputs and the accumulator bypassed.
2. Two 9×9 multipliers with unregistered outputs and the accumulator bypassed.
3. One 9×9 multiplier with unregistered output and the other 9×9 multiplier with registered output with accumulator bypassed.
4. One 9×9 multiplier followed by the accumulator and the other 9×9 multiplier with registered/unregistered output.
5. One 9×9 multiplier followed by the accumulator with one input as C or accumulator controlled by a dynamic signal.
6. Accumulator with an initial value.

The present architecture also allows initiation of a new accumulation cycle without resetting the accumulator (41). A dynamic SMUX signal selects the data input C. The said signal is either programmed to zero (in case no additional input is required) or provided an appropriate value.

Figure 7:
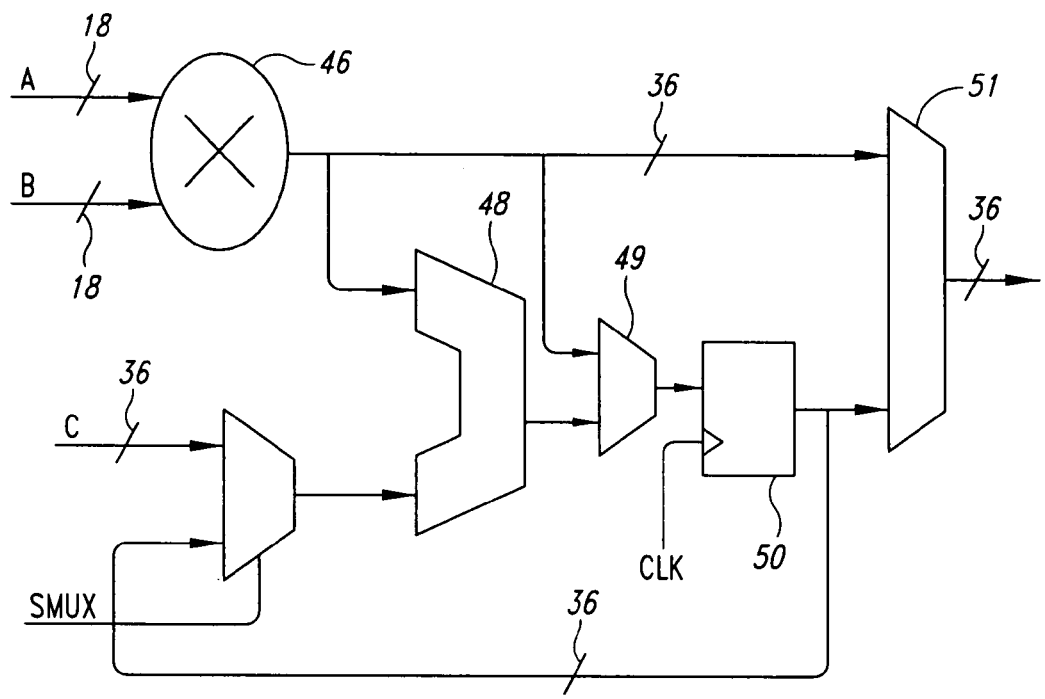
FIG. 7 shows the DSP block in mode 1 with its data path highlighted.

FIG. 7 shows the DSP block operating in mode 1 with its data path highlighted and as described below. The output of the 18×18 multiplier (46) is fed directly to the multiplexer (51) with the accumulator (48) bypassed. The 36-bit output thus obtained is unregistered.

Figure 8:
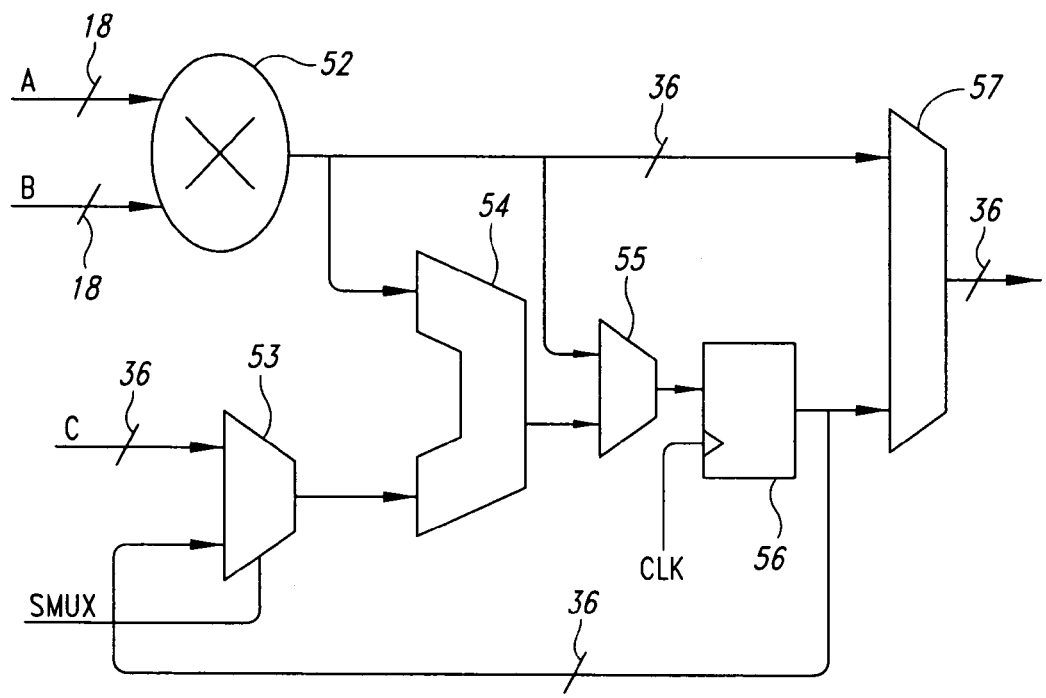
FIG. 8 shows the DSP block in mode 2 with its data path highlighted.

FIG. 8 shows the DSP block operating in mode 2 with its data path highlighted and as described below. The output of the 18×18 multiplier (52) is fed to the multiplexer (55) with the accumulator (54) bypassed. The 36-bit output thus obtained from the multiplexer (57) is registered as it passes through the register (56).

Figure 9:
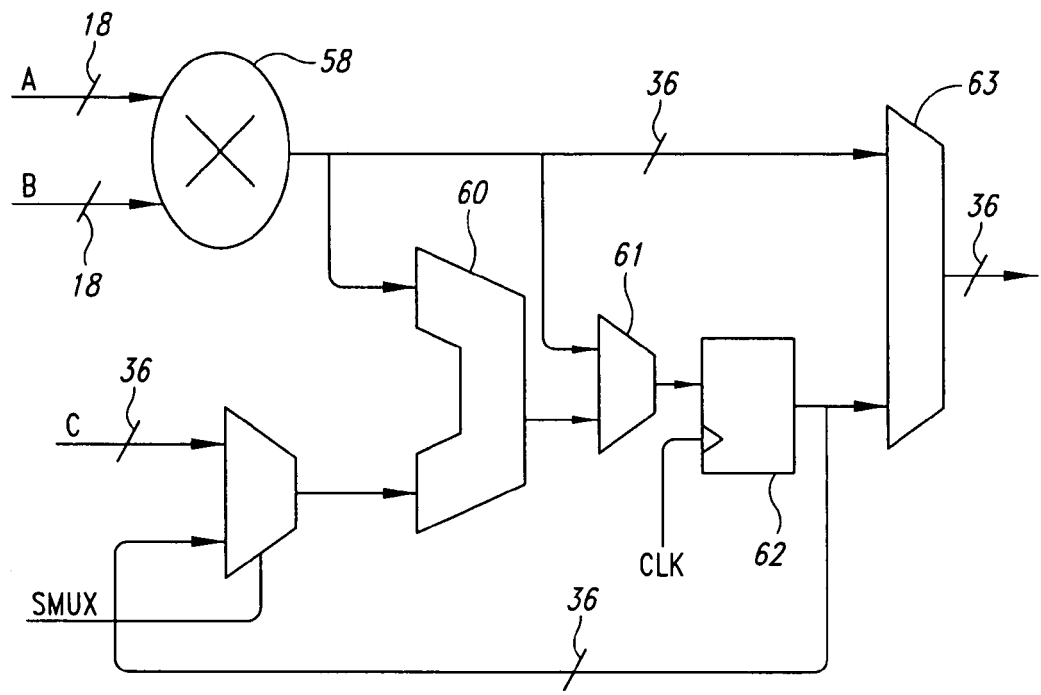
FIG. 9 shows the DSP block in mode 3 with its data path highlighted.

FIG. 9 shows the DSP block operating in mode 3 with its data path highlighted and as described below. The output of the 18×18 multiplier (58) is fed to the accumulator (60), with the second input of the accumulator (60) being a feedback. The multiplexer (61) receives the data from the accumulator (60) and passes it to the register (62). The multiplexer (59) in turn passes the feedback data to the accumulator (60), which accumulates the data. The 36-bit output thus obtained from the above-mentioned multiplexer (63) is in accordance with the equation 1.

Figure 10:
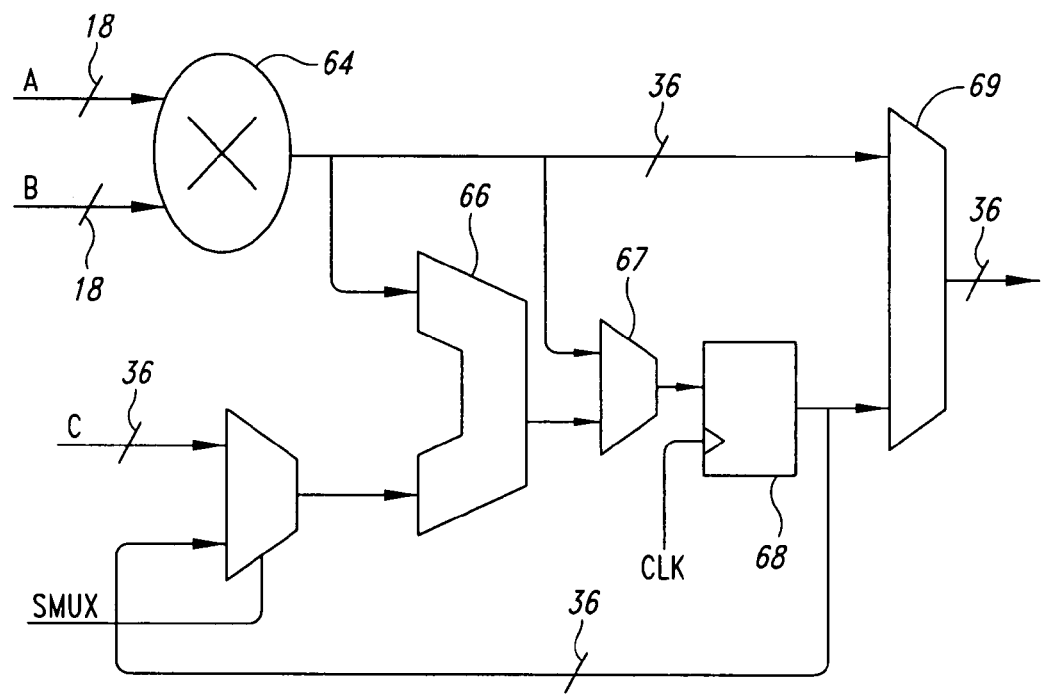
FIG. 10 shows the DSP block in mode 4 with its data path highlighted.

FIG. 10 shows the DSP block operating in mode 4 with its data path highlighted and as described below. The output of the 18×18 multiplier (64) is fed to the accumulator (66), which receives a 36-bit data input C at its other input. The multiplexer (67) receives the data from the accumulator (66) and passes it to the register (68), which further passes it to the multiplexer (69). The 36-bit output thus obtained from the multiplexer (69) is in accordance with the above-mentioned equation 2 as the output is the accumulation of the 36-bit product and the 36-bit input.

Figure 11:
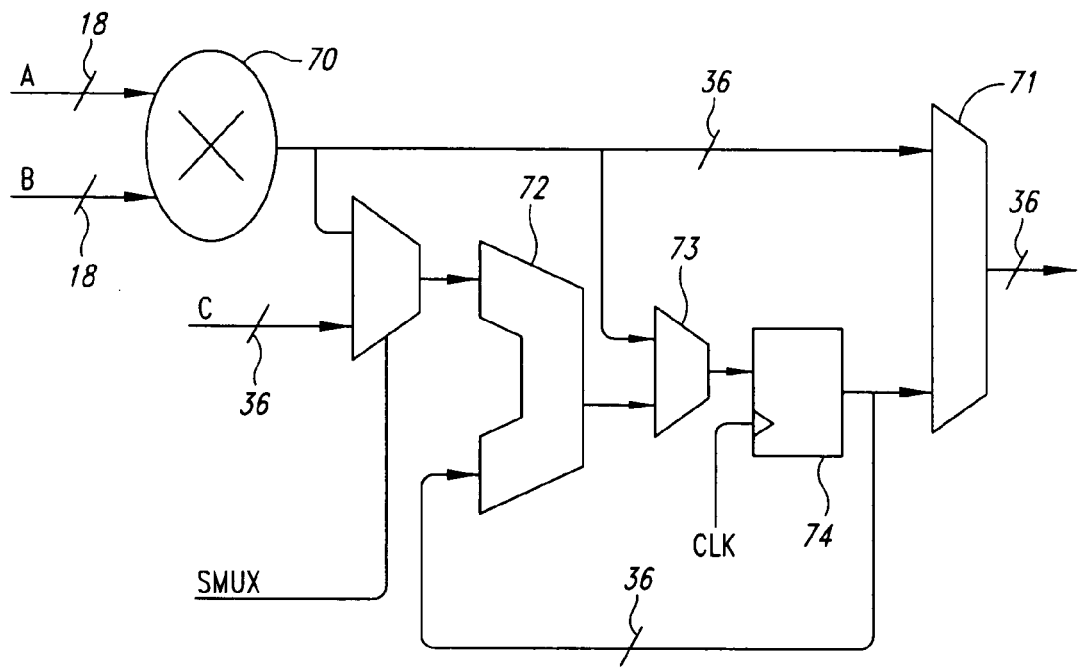
FIG. 11 shows an embodiment of the instant invention.

FIG. 11 shows another embodiment of the present invention with a different implementation of the DSP block. All the 9×9 modes and the 18×18 modes can be implemented using this structure. The accumulator (72) has a dedicated feedback at one of its input with the other selectable input is received from the multiplexer (71). The 2:1 multiplexer (71) receives the output of multiplier (70) as one input while the other input is the data input C. This architecture allows the user to add an extra coefficient anytime during the accumulation cycle without breaking it as the multiplexer (71) output or the data input C gets accumulated with the feedback data. Thus both the above-mentioned DSP equations are implemented efficiently.

Figure 12:
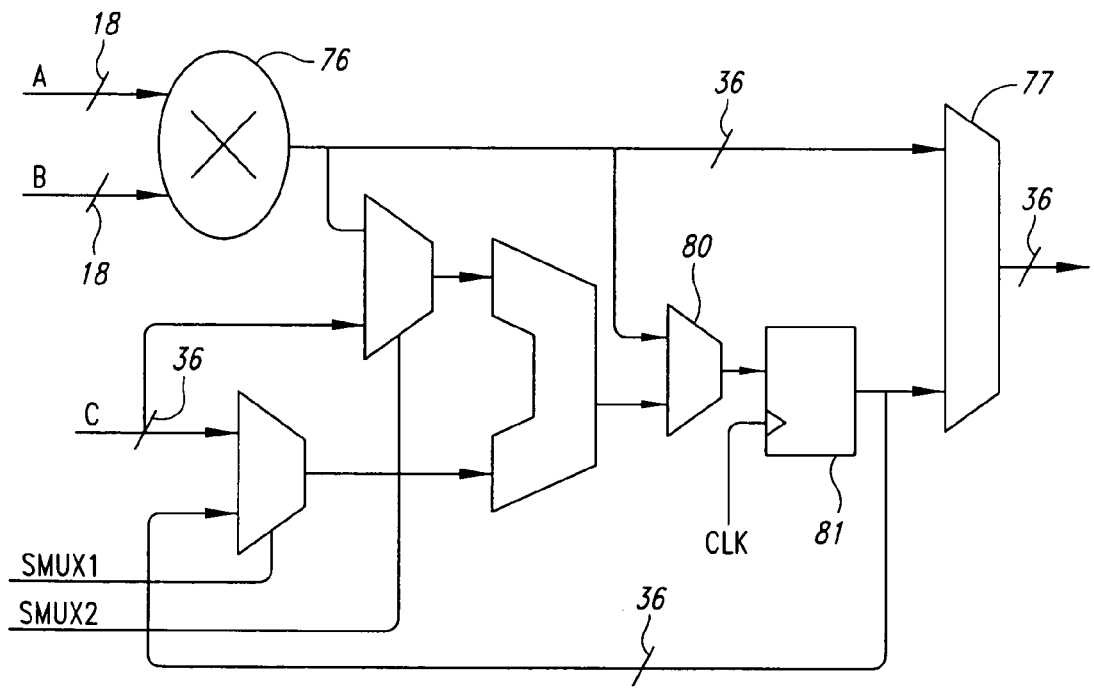
FIG. 12 shows yet another embodiment of the instant invention.

FIG. 12 shows yet another embodiment of the present invention having an additional 2:1 multiplexer (77). The multiplexer (77) receives the output of the multiplier (76) as one input while the other input of the multiplexer (77) is the data input C. This allows accumulation of an external input signal. An additional dynamic signal is provided with the multiplexer (77). This allows an efficient accumulation of the multiplier (76) output and/or the external input and takes only one clock cycle for adding an extra coefficient.

Figure 13:
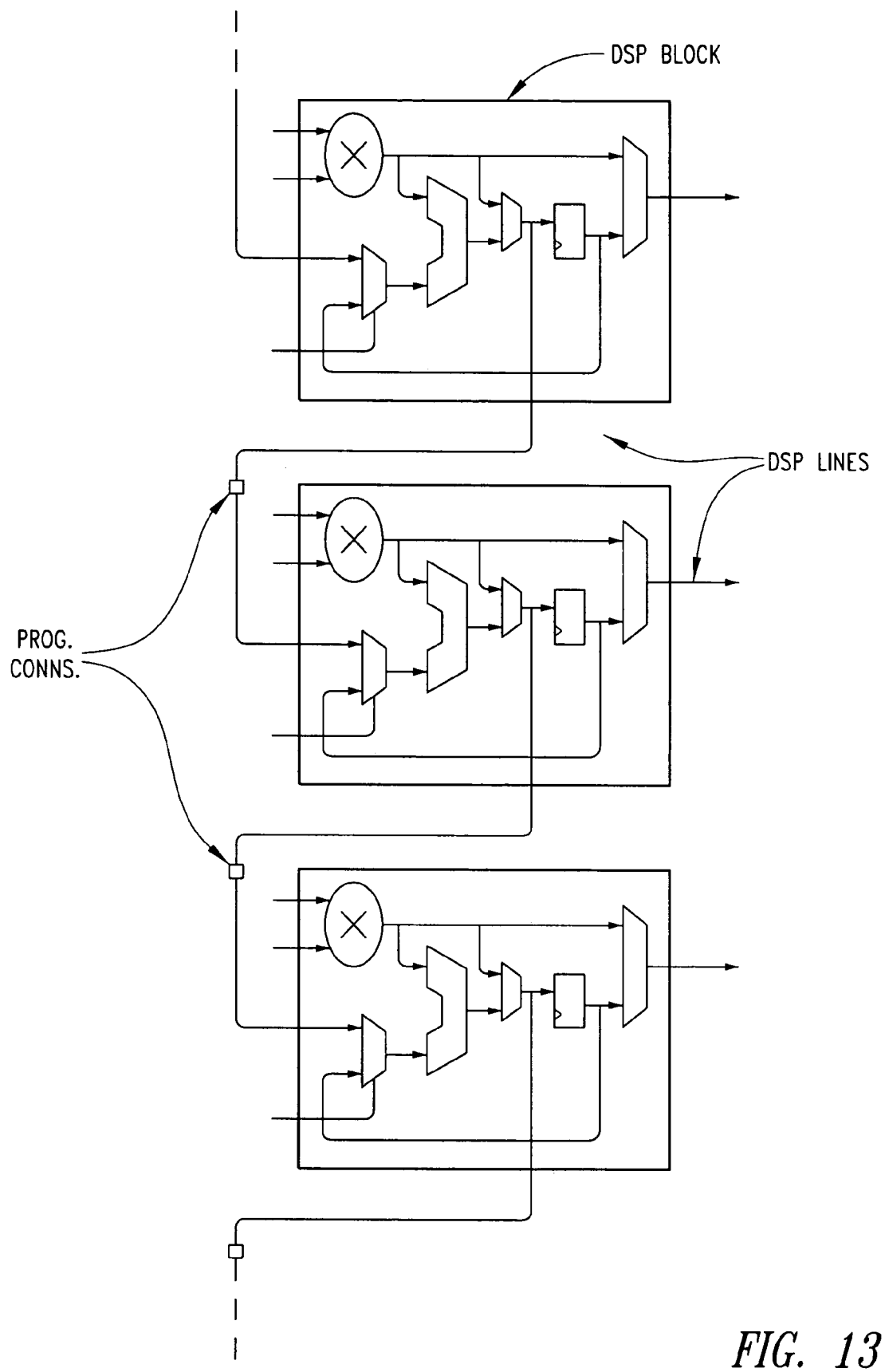
FIG. 13 represents the cascading of DSP blocks using accumulator output in one column of the FPGA.

FIG. 13 shows the cascaded DSP blocks in one column of the FPGA. The cascading of the DSP blocks is done using the output of second multiplexer of one DSP block connected to the data input C of the subsequent DSP block.

Figure 14:
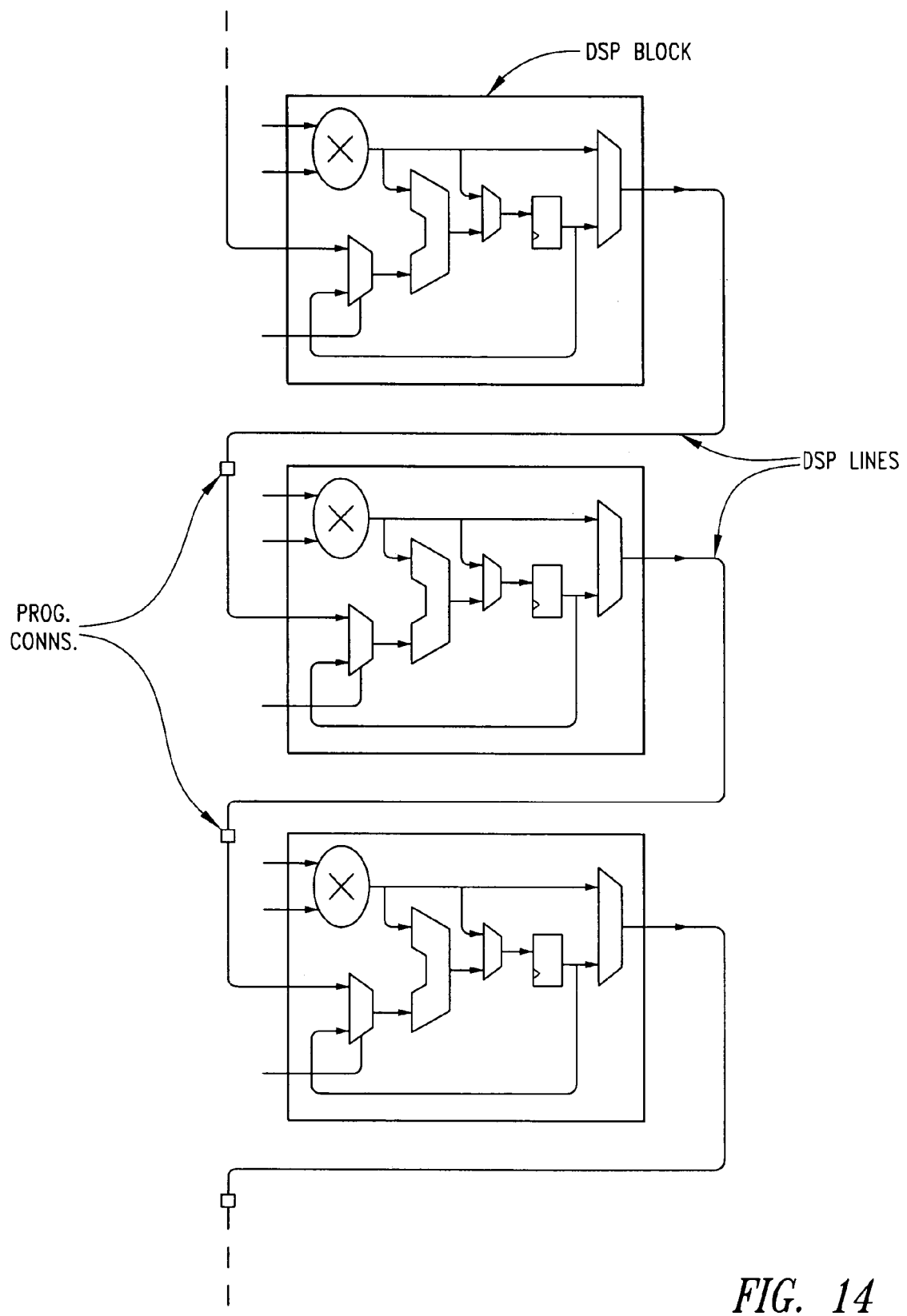
FIG. 14 shows the cascading of DSP blocks using the output of the DSP block in one column of the FPGA.

FIG. 14 shows another embodiment of the present invention where the output of the DSP block is used for cascading instead of the output of the accumulator as shown in FIG. 14. This implements the filter structure with a pipeline register between the adder stages.

Above-mentioned cascading of two or more DSP blocks can be used in a column to build a highly efficient structure for the implementation of FIR filters, one of the most common applications in the DSP domain.

Figure 15:
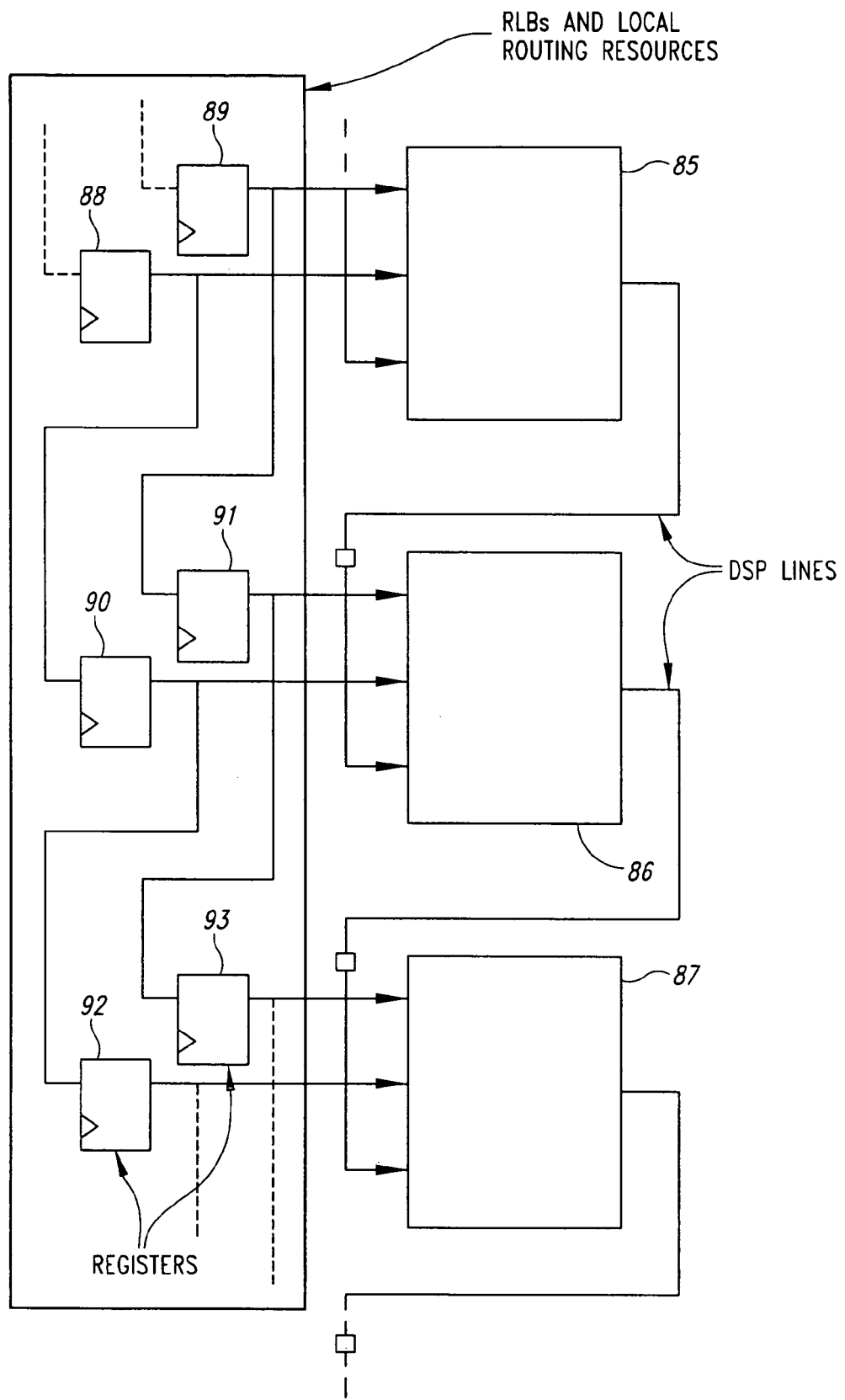
FIG. 15 shows the cascaded DSP blocks to implement n-stage MAC operations.

FIG. 15 shows how the cascaded DSP blocks (85, 86, 87 and the like) emulate the structure of an n-tap FIR filter. The delay elements or the registers (88-93) are implemented in LUTs adjacent to their respective DSP blocks. The connections between the registers (88-93) are made using general-purpose routing resources. Another embodiment of the present invention can include shift registers in the DSP block itself for a still better implementation, which would not require any general-purpose routing resources. The DSP lines shown in FIG. 15 are dedicated lines provided for fast DSP block cascading. The programmable connections provided between two DSP blocks allow the cascading of any number of DSP blocks in one column.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

We claim:

1. A Field Programmable Gate Array (FPGA) comprising:
   a first computational block comprising:
      a multiplier configured to receive a first data input and a second data input;
      a first multiplexer comprising a dynamic select line and configured to receive a third data input;
      an accumulator configured to receive an output of the multiplier and an output of the first multiplexer;
      a second multiplexer configured to receive an output of the multiplier and an output of the accumulator;
      a register configured to receive an output of the second multiplexer and to provide an output and a feedback to the first multiplexer; and
      a third multiplexer configured to receive the output of the register and to provide a first computational block output; and
   a second computational block cascaded with the first computational block, wherein the second computational block is configured to receive the output of the second multiplexor without using the first computational block output of the third multiplexor.

2. The FPGA of claim 1, wherein the first computational block further comprises a fourth multiplexer configured to receive the output of the multiplier and the third data input.

3. The FPGA of claim 1, wherein the multiplier comprises at least two multipliers.

4. A Field Programmable gate array (FPGA) comprising:
   a first computational block comprising:
      a multiplier configured to receive a first data input and a second data input;
      a first multiplexer comprising a dynamic select line and configured to receive an output of the multiplier and a third data input;
      an accumulator configured to receive an output of the first multiplexer;
      a second multiplexer configured to receive an output of the multiplier and an output of the accumulator;
      a register configured to receive an output of the second multiplexer and to provide an output of the register and a feedback to the accumulator; and
      a third multiplexer configured to receive the output of the register and to provide a first computational block output; and
   a second computational block cascaded with the first computational block, wherein the second computational block is configured to receive the output of the second multiplexer without using the first computational block output of the third multiplexer.

5. The FPGA of claim 4, wherein the multiplier comprises at least two multipliers.

6. The FPGA of claim 4, wherein the first computational block further comprises a fourth multiplexer configured to receive the output of the multiplier and the third data input.

7. A circuit comprising:
   a first computational block comprising:
      a multiplier configured to receive a first data input and a second data input;
      an accumulator configured to receive an output of the multiplier;
      a first multiplexer configured to receive the output of the multiplier and an output of a register interposed between the accumulator and the first multiplexer, wherein the first multiplexer is configured to provide a first computational block output;
      a second multiplexer configured to receive a third data input and the output of the register, the second multiplexer controlled by a dynamic select signal, the second multiplexer configured to provide an output to the accumulator; and
      a third multiplexer configured to receive the output of the multiplier and an output of the accumulator and to provide an output to the register; and
   a second computational block cascaded with the first computational block, wherein the second computational block is configured to receive the output of the third multiplexer without using the first computational block output of the first multiplexer.

8. The circuit of claim 7, wherein the first computational block is configured to provide multiple modes of operation, the multiple modes of operations comprising:
   a first mode in which the output of the multiplier is output directly through the first multiplexer and the accumulator is bypassed;
   a second mode in which the output of the multiplier is output through the register and the accumulator is bypassed;
   a third mode in which the output of the multiplier passes through the accumulator, the register, and then to the first multiplexer;
   a fourth mode in which the output of the multiplier is passed through the accumulator with the third data input, or the accumulator is controlled by the dynamic select signal; and
   a fifth mode in which the accumulator has an initial value that is output through the first multiplexer.

9. The circuit of claim 7, wherein the first computational block further comprises a second multiplier configured to provide an output to a second register that is controlled by a clock signal, and a fourth multiplexer configured to receive an output of the second register and an output of the second multiplier.

10. The circuit of claim 9, wherein the first computational block is configured to provide multiple modes of operation, the multiple modes of operation comprising:
    a first mode in which the output of the first and second multipliers are registered with the respective first and second registers and the accumulator is bypassed;
    a second mode in which the output of the first and second multipliers is passed directly to the first and fourth multiplexers respectively and the accumulator is bypassed;
    a third mode in which one of the first and second multipliers has an unregistered output and the other of the first and second multipliers has a registered output and the accumulator is bypassed;
    a fourth mode in which one of the first and second multipliers is followed by the accumulator and the other of the first and second multipliers has either a registered or an unregistered output;
    a fifth mode in which one multiplier is followed by the accumulator with one input constituting the third input or the accumulator is controlled by the dynamic select signal; and
    a sixth mode in which an output of the circuit is an initial value stored in the accumulator.

11. The circuit of claim 10, wherein a dynamic select signal is configured to select the third input as the output of the circuit.

12. The circuit of claim 7, wherein the first computational block further comprises a fourth multiplexer configured to receive the output of the multiplier and the third data input.

* * * * *

UNITED STATES PATENT AND TRADEMARK OFFICE
CERTIFICATE OF CORRECTION

| | |
|---|---|
| PATENT NO. | : 8,112,466 B2 |
| APPLICATION NO. | : 11/238123 |
| DATED | : February 7, 2012 |
| INVENTOR(S) | : Minz et al. |

Page 1 of 1

It is certified that error appears in the above-identified patent and that said Letters Patent is hereby corrected as shown below:

Title page, item (57), under "Abstract", in Column 2, Line 3, delete "having of a" and insert -- having a --.

Column 7, line 1, in Claim 1, delete "multiplexor" and insert -- multiplexer --.

Column 7, line 2, in Claim 1, delete "multiplexor." and insert -- multiplexer. --.

Column 7, line 8, in Claim 4, delete "Field Programmable gate array" and insert -- Field Programmable Gate Array --.

Signed and Sealed this
Twenty-eighth Day of August, 2012

David J. Kappos
*Director of the United States Patent and Trademark Office*